US012590692B1

(12) United States Patent
Long

(10) Patent No.: US 12,590,692 B1
(45) Date of Patent: Mar. 31, 2026

(54) CLAMP SLOT STRUCTURE FOR ROTATABLE SPOTLIGHT

(71) Applicant: Dongguan KJH Lights Co., LTD, Dongguan (CN)

(72) Inventor: Hu Long, Shenzhen (CN)

(73) Assignee: Dongguan KJH Lights Co., LTD, Dongguan (CN)

( * ) Notice: Subject to any disclaimer, the term of this patent is extended or adjusted under 35 U.S.C. 154(b) by 0 days.

(21) Appl. No.: 19/187,471

(22) Filed: Apr. 23, 2025

(51) Int. Cl.
*F21V 21/088* (2006.01)

(52) U.S. Cl.
CPC .................................. *F21V 21/088* (2013.01)

(58) Field of Classification Search
CPC ........ F21V 21/088; F21V 21/14; F21V 21/30; F21V 21/042; F21V 21/044; F21V 19/02; F21V 21/02; F21V 21/03
See application file for complete search history.

(56) References Cited

U.S. PATENT DOCUMENTS 3,555,341 A * 1/1971 Curtis ...................... H01J 5/60 439/619
4,005,924 A * 2/1977 Nestor .................. H01R 33/09 439/77
4,152,622 A * 5/1979 Fitzgerald ................ H01K 1/44 313/318.09
4,468,585 A * 8/1984 Beyland ................... H01K 1/46 313/318.07
5,377,087 A * 12/1994 Yoon ....................... F21V 21/30 362/372
5,707,143 A * 1/1998 Hentz .................. F21V 17/164 362/147
10,125,958 B1 * 11/2018 Wronski ............... F21V 21/047
10,890,314 B2 * 1/2021 Hibino ..................... B60Q 3/44
11,098,883 B2 * 8/2021 Zeng ....................... F21V 14/02
11,662,084 B2 * 5/2023 Cohen .................. F21V 21/049 362/341
12,305,838 B1 * 5/2025 Long ....................... F21V 14/02
12,460,780 B2 * 11/2025 Cohen .................. F21V 21/047
2002/0186567 A1 * 12/2002 Brown ..................... B60Q 3/74 362/341

* cited by examiner

*Primary Examiner* — Ismael Negron
(74) *Attorney, Agent, or Firm* — Birchwood IP

(57) ABSTRACT

A clamp slot structure includes a base and a lamp holder, an inner wall of a circular installation part on a back of the base is provided with two pairs of diagonally distributed wide edge clamp slots and narrow edge clamp slots, and the lamp holder is correspondingly provided with wide edge installation platforms and narrow edge installation platforms. During installation, the wide edge installation platforms are inserted vertically into the wide edge clamp slots after aligning, the lamp holder is rotated 90 degrees, and the wide edge installation platforms are clamped to a surface of an installation protrusion.

8 Claims, 4 Drawing Sheets

CLAMP SLOT STRUCTURE FOR ROTATABLE SPOTLIGHT

TECHNICAL FIELD

The present disclosure relates to the field of lighting device technologies, and in particular, to a clamp slot structure for a rotatable spotlight.

BACKGROUND

Due to the need to embed embedded ceiling lighting inside the ceiling, the installation space is limited, and the operating line of sight is restricted. The existing installation structure generally has the following problems.

Complicated alignment: traditional evenly distributed clamp slots require aligning multiple clamping points simultaneously during installation, and operators need to repeatedly adjust the angle of the lighting device, which can easily lead to incomplete insertion of the clamping points due to errors.

Insufficient locking force: buckle structure relies on friction or elastic deformation for fixation, and after installation, rotation and adjustment angle of the lighting device can easily cause the buckle to loosen, thereby posing a risk of detachment.

Inconvenient disassembly: some embedded structures require tools for disassembly, which may scratch the surface of the ceiling during maintenance.

SUMMARY

Given the above situation, it is necessary to provide a clamp slot structure for a rotatable spotlight that solves at least one of the above problems, the slot structure for a rotatable spotlight, including a base and a lamp holder;

- a back of the base is provided with an annular installation part, and an inner wall of the installation part is provided with two pairs of diagonally distributed installation protrusions along a circumference direction; the two pairs of installation protrusions are one pair of wide edge clamp slots and one pair of narrow edge clamp slots;
- a side wall of the lamp holder is provided with two pairs of diagonally distributed clips, and ends of each pair of clips are provided with installation platforms; one pair of clips is wide edge installation platforms, and the other pair of clips is narrow edge installation platforms;
- widths of the wide edge installation platforms are adapted to widths of the wide edge clamp slots, widths of the narrow edge installation platforms are adapted to widths of the narrow edge clamp slots, and depths of the wide edge clamp slots are smaller than depths of the narrow edge clamp slots.

In some embodiments of the present disclosure, two side edges of each pair of installation protrusions are provided with baffles.

In some embodiments of the present disclosure, the lamp holder is made of metal material.

In some embodiments of the present disclosure, the installation protrusions are extended towards a center of the base, so that mouths of the clamp slots are visible from a front of the base.

In some embodiments of the present disclosure, depths of the wide edge clamp slots are 1-2 mm, and depths of the narrow edge clamp slots are 3-5 mm.

In some embodiments of the present disclosure, horizontal extension lengths of the installation platforms are 1.2-1.5 times widths of the clamp slots.

In some embodiments of the present disclosure, the lamp holder has a shape of circular or square.

In some embodiments of the present disclosure, width ratios of the wide edge clamp slots to the narrow edge clamp slots are 1.5-2:1.

DESCRIPTION OF EMBODIMENTS

In order to clarify the purpose, technical solution, and advantages of the present disclosure, a clamp slot structure of a rotatable spotlight of the present disclosure will be further described in detail with reference to the accompanying drawings and embodiments. It should be understood that specific embodiments described herein are only for explaining the present disclosure and are not intended to limit the present disclosure.

In a description of the present disclosure, unless otherwise specified, "multiple" means two or more; terms "center", "vertical", "longitudinal", "up", "down", "left", "right", "inside", "outside", "front end", "rear end", "head end", "tail end", "vertical", "horizontal", "top", "bottom", "inside", "outside" and other directional or positional relationships indicated are based on directional or positional relationships shown in the accompanying drawings and are only for a convenience of describing the present disclosure and simplifying the description, and do not indicate or imply that the device or element referred to must have a specific orientation, be constructed and operated in a specific orientation, and therefore cannot be understood as limiting the present disclosure. Besides that, terms "first", "second", "third", etc. are only used for a descriptive purpose and cannot be understood as indicating or implying relative importance.

In the description of the present disclosure, it should be noted that unless otherwise specified and limited, terms "installation", "connection to", and "connection with" should be broadly understood, for example, it can be a fixed connection, a detachable connection, or an integral connection; it can be a mechanical connection or an electrical connection; it can be directly connected, indirectly connected through an intermediate medium, or connected internally between two components. For those skilled in the art, specific meanings of the above terms in this specification can be understood through specific situations.

Figure 1:
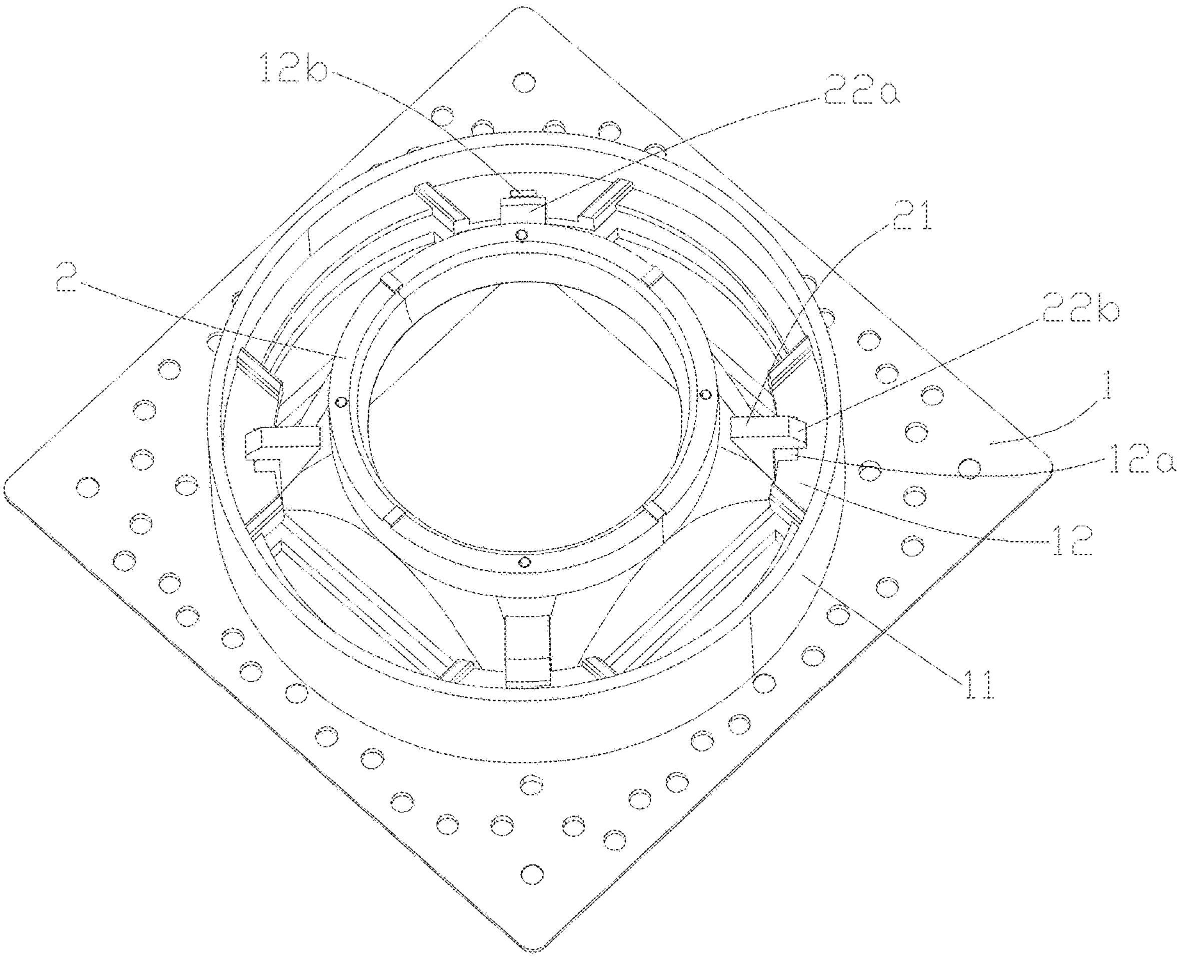
FIG. 1 is a schematic structural diagram of a lamp holder provided on a base according to an embodiment of the present disclosure.
Figure 2:
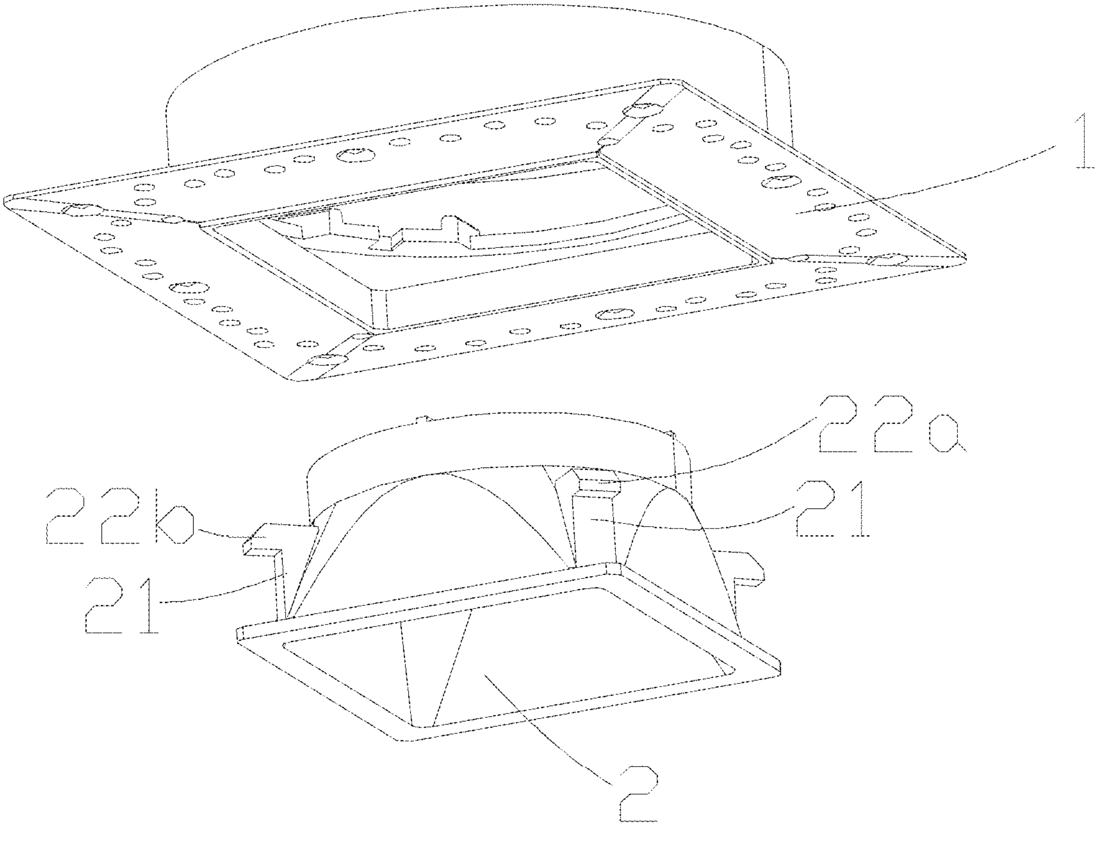
FIG. 2 is an exploded view of the lamp holder provided on the base according to an embodiment of the present disclosure.
Figure 3:
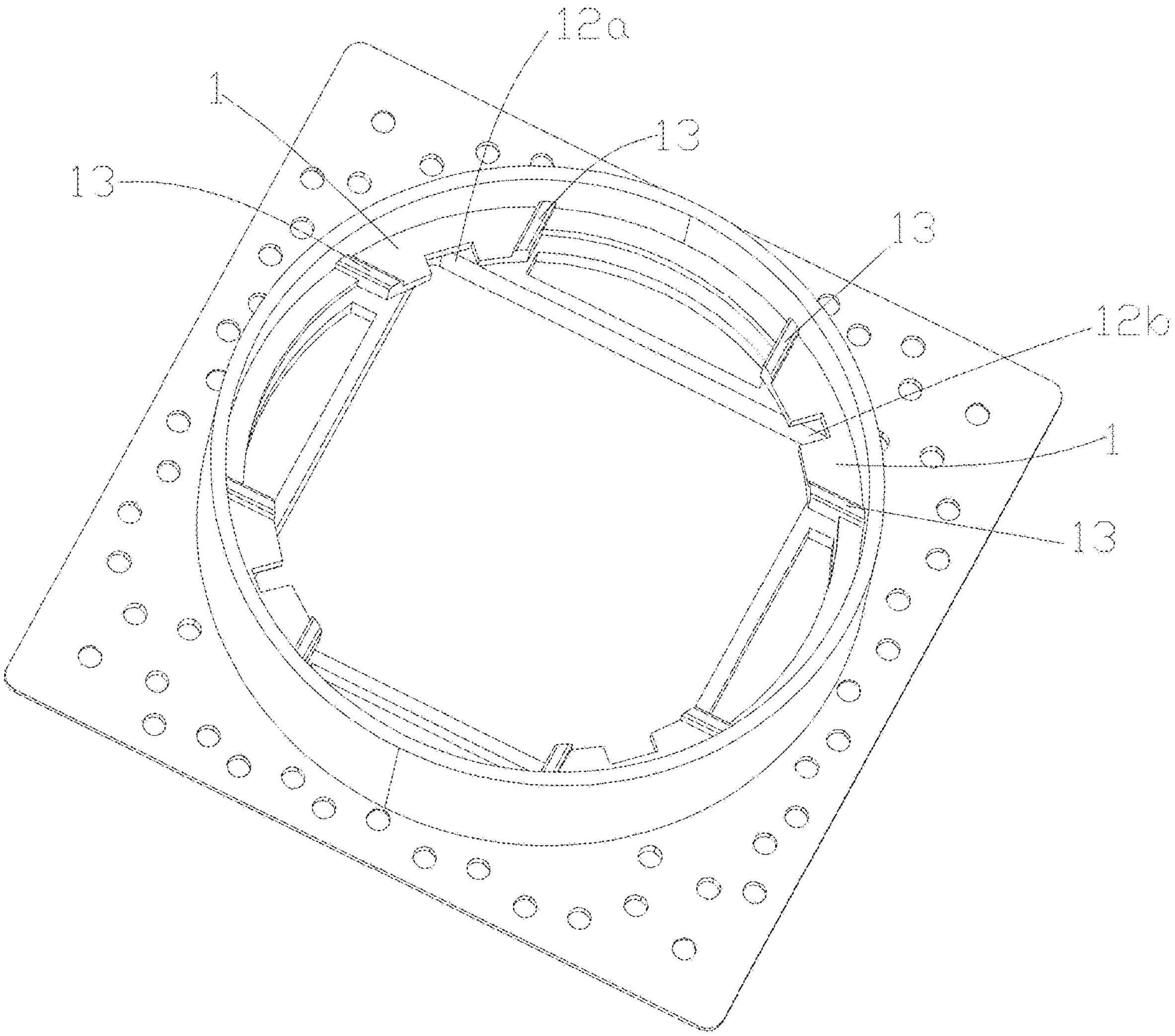
FIG. 3 is a schematic structural diagram of a back of the base according to an embodiment of the present disclosure.
Figure 4:
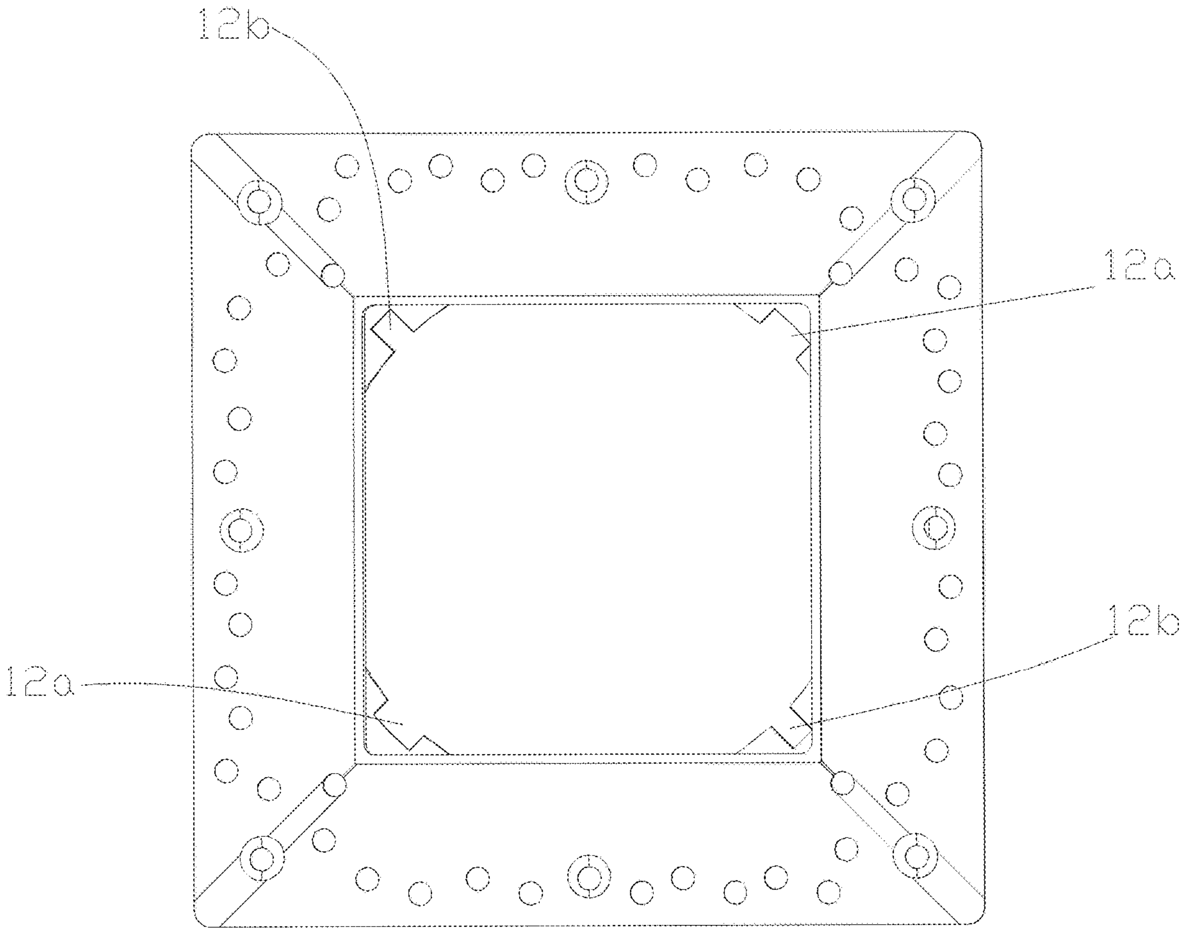
FIG. 4 is a schematic diagram of a front structure of the base according to an embodiment of the present disclosure.

Please refer to FIGS. 1 to 4. A clamp slot structure for a rotatable spotlight according to an embodiment of the present disclosure includes a base 1 and a lamp holder 2; a back of the base 1 is provided with an annular installation part 11, and an inner wall of the installation part 11 is provided with two pairs of diagonally distributed installation protrusions 12 along a circumference direction. The two pairs of installation protrusions 12 are one pair of wide edge clamp slots 12*a* and one pair of a narrow edge clamp slots 12*b*. One side wall of the lamp holder 2 is provided with two pairs of diagonally distributed clips 21, and ends of each pair of clips 21 are provided with installation platforms 22. One pair of clips is wide edge installation platforms 22A, and the other pair of clips are narrow edge installation platforms 22B; widths of the wide edge installation platforms 22A are adapted to widths of the wide edge clamp slots 12*a*, widths of the narrow edge installation platforms 22B are adapted to widths of the narrow edge clamp slots 12*b*, and depths of the wide edge clamp slots 12*a* are smaller than depths of the narrow edge clamp slots 12*b*.

When installing, the base 1 is first installed into a ceiling, then the wide edge installation platforms 22*a* are aligned with the wide edge clamp slots 12*a*, and the narrow edge installation platforms 22*b* are aligned with the narrow edge clamp slots 12*b*. After vertically pushing in, the lamp holder is rotated clockwise by 90°. The wide edge installation platforms 22*a* are laterally clamped on surfaces of the installation protrusions 12 due to the widths of the wide edge installation platforms 22*a* being greater than the narrow edge clamp slots 12*b*. At the same time, the wide edge clamp slots 12*a* with shallow depth prevents the wide edge installation platforms 22*a* from retracting in an opposite direction, and finally it is locked through a mechanical limit.

When disassembling, similarly, when the lamp holder 2 needs to be disassembled, the lamp holder 2 is rotated counterclockwise to an initial installation angle (90° reset). At this time, the wide edge installation platforms 22A realign with opening positions of the wide edge clamp slots 12*a*, and the narrow edge installation platforms 22B synchronously return to align with the narrow edge clamp slots 12*b*. Due to the shallow depth of the wide edge clamp slots 12*a*, a user only needs to pull the lamp holder 2 vertically downwards, and the wide edge installation platforms 22A will exit from the wide edge clamp slots 12*a*, and the narrow edge installation platforms 22B will detach from the narrow edge clamp slots 12*b*. During a rotation reset process, the wide edge installation platforms 22A and the narrow edge clamp slots 12*b* automatically separate and release a lateral lock due to width differences, and the lamp holder 2 can be smoothly removed without a need for tool assistance throughout the entire process. By a combination of depth differences of the clamp slots and irregular shapes, this structure can be quickly separated by applying only vertical tension during disassembly, thereby avoiding component wear caused by prying in traditional buckle disassembly.

Please refer to FIGS. 1 to 4. In an implementation mode, two side edges of each pair of installation protrusions 12 are provided with baffles 13. The baffles 13 are arranged perpendicular to end faces of the installation protrusions 12. When the lamp holder 2 is rotated, the clips 21 are moved along inner sides of the baffles 13. When it is rotated to 90°, the two side baffles 13 block the clips 21 from continuing to rotate. Beneficial effect: limiting a rotation angle and avoiding locking failure caused by an excessive rotation displacement.

Please refer to FIGS. 1 to 4. In an implementation mode, the lamp holder 2 is made of metal material. The clips 21 of the metal lamp holder 2 are integrated with the installation platforms 22 through stamping, and are not easily deformed under high temperature or high load conditions. Beneficial effects: enhancing structural strength and heat dissipation performance, improving service life, and at the same time, rendering the lamp holder 2 heavier, which can be installed on the base 1 by its own weight.

Please refer to FIGS. 1 to 4. In an implementation mode, the installation protrusions 12 are extended towards a center of the base 1, rendering mouths of the clamp slots are visible from a front of the base 1. Extending part of the installation protrusions 12 passes through a through-hole of the base 1, and the user can directly observe the opening positions of the wide edge clamp slots 12*a* and the narrow edge clamp slots 12*b* from a front view of the base 1. Beneficial effect: eliminating blind spots in installation perspective, facilitating quick alignment.

Please refer to FIGS. 1 to 4. In an implementation mode, depths of the wide edge clamp slots 12*a* are 1-2 mm, and depths of the narrow edge clamp slots 12*b* are 3-5 mm. A shallow depth of the wide edge clamp slots 12*a* allows them to only accommodate the vertical insertion of the wide edge installation platforms 22A, and cannot be retracted in an opposite direction after rotation, depths of the narrow edge clamp slots 12*b* ensure that the narrow edge installation platforms 22B are fully embedded into the clamp slots to form a stable support. Beneficial effect: by combining shallow and deep grooves, bidirectional anti loosening locking is achieved.

Please refer to FIGS. 1 to 4. In an implementation mode, horizontal extension lengths of the installation platforms 22 are 1.2-1.5 times widths of the clamp slots. If the widths of the wide edge clamp slots 12*a* are 6 mm, the horizontal extension lengths of the wide edge installation platforms 22A are 7-9 mm. After rotation, excess parts (1-3 mm) of the installation platforms 22 overlaps with surfaces of the installation protrusions 12. Beneficial effect: increasing a contact area and preventing lamp head from shaking.

Please refer to FIGS. 1 to 4. In an implementation mode, the lamp holder 2 has a shape of circular or square. The clips 21 of the circular lamp holder 2 are evenly distributed along the circumference direction. The clips 21 of the square lamp holder 2 are distributed at a connection point of adjacent sides. Beneficial effect: adapting to appearance requirements of different installation scenarios.

Please refer to FIGS. 1 to 4. In an implementation mode, width ratios of the wide edge clamp slots 12*a* to the narrow edge clamp slots 12*b* are 1.5-2:1. When the widths of the wide edge clamp slots 12*a* are 9 mm, widths of the narrow edge clamp slots 12*b* are 4.5-6 mm. The narrow edge installation platforms 22B can pass through the wide edge clamp slots 12*a*, but the wide edge installation platforms 22A cannot enter the narrow edge clamp slots 12*b*. Mandatory differentiation of installation directions through proportional design to avoid incorrect installation.

The above description is only the preferred embodiment of the present disclosure and does not limit the present disclosure in any form. Although the present disclosure has been disclosed in the preferred embodiment, it is not intended to limit the present disclosure. Any skilled person in the art who is familiar with this field can use the disclosed technical solution to make minor changes or modifications to equivalent embodiments without departing from the scope of the technical solution of the present disclosure. Any minor modifications, equivalent changes, and modifications made to the above embodiments based on the technical essence of the present disclosure without departing from the technical solution of the present disclosure still belong to the scope of the technical solution of the present disclosure.

What is claimed is:

1. A clamp slot structure for a rotatable spotlight, comprising a base and a lamp holder;

a back of the base is provided with an annular installation part, and an inner wall of the installation part is provided with two pairs of diagonally distributed installation protrusions along a circumference direction; the two pairs of installation protrusions are one pair of wide edge clamp slots and one pair of narrow edge clamp slots;

a side wall of the lamp holder is provided with two pairs of diagonally distributed clips, and ends of each pair of clips are provided with installation platforms; one pair of clips is wide edge installation platforms, and the other pair of clips is narrow edge installation platforms;

widths of the wide edge installation platforms are adapted to widths of the wide edge clamp slots, widths of the narrow edge installation platforms are adapted to widths of the narrow edge clamp slots, and depths of the wide edge clamp slots are smaller than depths of the narrow edge clamp slots.

2. The clamp slot structure for a rotatable spotlight according to claim 1, wherein the installation protrusions are extended towards a center of the base, so that mouths of the clamp slots are visible from a front of the base.

3. The clamp slot structure for a rotatable spotlight according to claim 1, wherein depths of the wide edge clamp slots are 1-2 mm, and depths of the narrow edge clamp slots are 3-5 mm.

4. The clamp slot structure for a rotatable spotlight according to claim 1, wherein horizontal extension lengths of the installation platforms are 1.2-1.5 times widths of the clamp slots.

5. The clamp slot structure for a rotatable spotlight according to claim 1, wherein the lamp holder has a shape of circular or square.

6. The clamp slot structure for a rotatable spotlight according to claim 1, wherein width ratios of the wide edge clamp slots to the narrow edge clamp slots are 1.5-2:1.

7. The clamp slot structure for a rotatable spotlight according to claim 1, wherein two side edges of each pair of installation protrusions are provided with baffles.

8. The clamp slot structure for a rotatable spotlight according to claim 7, wherein the lamp holder is made of metal material.

* * * * *